(12) United States Patent
Stent et al.

(10) Patent No.: US 10,672,381 B2
(45) Date of Patent: *Jun. 2, 2020

(54) SYSTEM AND METHOD FOR DIALOG MODELING

(71) Applicant: AT&T Intellectual Property I, L.P., Atlanta, GA (US)

(72) Inventors: Amanda Stent, Chatham, NJ (US); Srinivas Bangalore, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/980,201

(22) Filed: May 15, 2018

(65) Prior Publication Data
US 2018/0261206 A1 Sep. 13, 2018

Related U.S. Application Data

(63) Continuation of application No. 14/845,634, filed on Sep. 4, 2015, now Pat. No. 9,972,307, which is a
(Continued)

(51) Int. Cl.
*G10L 15/22* (2006.01)
*G10L 15/06* (2013.01)
(Continued)

(52) U.S. Cl.
CPC ............ *G10L 15/063* (2013.01); *G06F 40/12* (2020.01); *G06F 40/137* (2020.01);
(Continued)

(58) Field of Classification Search
CPC ........................... G10L 15/22; G10L 15/1822
See application file for complete search history.

(56) References Cited

U.S. PATENT DOCUMENTS

| 4,974,191 A | 11/1990 | Amirghodsi et al. |
| 5,748,841 A | 5/1998 | Morin et al. |

(Continued)

OTHER PUBLICATIONS

Bangalore, Srinivas, Giuseppe Di Fabbrizio, and Amanda Stent. "Learning the structure of task-driven human-human dialogs." IEEE Transactions on Audio, Speech, and Language Processing 16.7 (2008): 1249-1259. (Year: 2008).*

(Continued)

*Primary Examiner* — Jialong He

(57) ABSTRACT

Disclosed herein are systems, computer-implemented methods, and computer-readable media for dialog modeling. The method includes receiving spoken dialogs annotated to indicate dialog acts and task/subtask information, parsing the spoken dialogs with a hierarchical, parse-based dialog model which operates incrementally from left to right and which only analyzes a preceding dialog context to generate parsed spoken dialogs, and constructing a functional task structure of the parsed spoken dialogs. The method can further either interpret user utterances with the functional task structure of the parsed spoken dialogs or plan system responses to user utterances with the functional task structure of the parsed spoken dialogs. The parse-based dialog model can be a shift-reduce model, a start-complete model, or a connection path model.

20 Claims, 7 Drawing Sheets

Related U.S. Application Data continuation of application No. 12/324,340, filed on Nov. 26, 2008, now Pat. No. 9,129,601.

(51) Int. Cl.
| | |
|---|---|
| *G10L 15/08* | (2006.01) |
| *G10L 15/183* | (2013.01) |
| *G06F 40/12* | (2020.01) |
| *G06F 40/137* | (2020.01) |
| *G10L 15/00* | (2013.01) |
| *G10L 15/04* | (2013.01) |
| *G10L 25/12* | (2013.01) |
| *G10L 15/18* | (2013.01) |
| *G06F 40/154* | (2020.01) |

(52) U.S. Cl.
CPC .......... *G10L 15/005* (2013.01); *G10L 15/04* (2013.01); *G10L 15/08* (2013.01); *G10L 15/183* (2013.01); *G10L 15/22* (2013.01); *G10L 25/12* (2013.01); *G06F 40/154* (2020.01); *G10L 15/18* (2013.01); *G10L 2015/0638* (2013.01)

(56) References Cited

U.S. PATENT DOCUMENTS

| | | | |
|---|---|---|---|
| 5,799,268 | A | 8/1998 | Boguraev |
| 5,999,904 | A | 12/1999 | Brown |
| 6,035,297 | A | 3/2000 | Van Huben et al. |
| 6,223,150 | B1 | 4/2001 | Duan et al. |
| 6,266,642 | B1 | 7/2001 | Franz et al. |
| 6,442,524 | B1 | 8/2002 | Ecker et al. |
| 6,510,411 | B1 | 1/2003 | Norton et al. |
| 6,601,055 | B1 | 7/2003 | Roberts |
| 6,868,383 | B1 | 3/2005 | Bangalore |
| 7,031,908 | B1 | 4/2006 | Huang et al. |
| 7,283,958 | B2 | 10/2007 | Azara et al. |
| 7,373,300 | B1 | 5/2008 | Bangalore et al. |
| 7,502,730 | B2 | 3/2009 | Wang |
| 7,519,529 | B1 | 4/2009 | Horvitz |
| 7,711,551 | B2 | 5/2010 | Lopez-Barquilla et al. |
| 7,805,302 | B2 | 9/2010 | Chelba et al. |
| 2002/0040292 | A1 | 4/2002 | Marcu |
| 2002/0046018 | A1 | 4/2002 | Marcu et al. |
| 2003/0061029 | A1 | 3/2003 | Shaket |
| 2003/0191625 | A1 | 10/2003 | Gorin et al. |
| 2003/0216905 | A1 | 11/2003 | Chelba et al. |
| 2003/0233223 | A1 | 12/2003 | Wang |
| 2003/0233230 | A1 | 12/2003 | Ammicht et al. |
| 2004/0049391 | A1 | 3/2004 | Polanyi et al. |
| 2005/0108001 | A1 | 5/2005 | Aarskog |
| 2005/0154591 | A1 | 7/2005 | Lecoeuche |
| 2005/0171926 | A1 | 8/2005 | Thione et al. |
| 2005/0182618 | A1 | 8/2005 | Azara |
| 2006/0009974 | A1 | 1/2006 | Junqua et al. |
| 2006/0074670 | A1 | 4/2006 | Weng et al. |
| 2006/0206332 | A1 | 9/2006 | Paek et al. |
| 2006/0271364 | A1 | 11/2006 | Mirkovic et al. |
| 2007/0050191 | A1 | 3/2007 | Weider |
| 2008/0134058 | A1 | 6/2008 | Shen et al. |
| 2008/0221902 | A1 | 9/2008 | Cerra et al. |
| 2009/0292529 | A1 | 11/2009 | Bangalore et al. |
| 2010/0076765 | A1 | 3/2010 | Zweig et al. |
| 2010/0131260 | A1 | 5/2010 | Bangalore et al. |
| 2010/0131274 | A1 | 5/2010 | Stent et al. |

OTHER PUBLICATIONS

Amanda J. Stent et al., "Statistical Shared Plan-Based Dialog Management", Proceedings of the International Conference on Spoken Language Processing (ICSLP), 2008, 4 pages.

Srinivas Bangalore et al., "Learning the Structure of Task-driven Human-Human Dialogs", Proceedings of the 21$^{st}$ International Conference on Computational Linguistics and 44$^{th}$ Annual Meeting of the ACL, Jul. 2006, pp. 201-208, Sydney.

William C. Mann et al., "Rhetorical Structure Theory: A Theory of Text Organization," Reprinted from the Structure of Discourse, Technical Report ISI/RS-87-190: Information Sciences Institute at the University of Southern California, Jun. 1987, 91 pages.

Srinivas Bangalore et al., "Incremental parsing models for dialog task structure", Proceedings of the 12$^{th}$ Conference of the European Chapter of the Association for Computational Linguistics, Association for Computational Linguistics, 2009.

Sagae et al., "A best-first probabilistic shift-reduce parser", Proceedings of the COLING/ACL on Main conference poster sessions. Association for Computational Linguistics, 2006.

Adwait Ratnaparkhi, "A Linear Observed Time Statistical Parser Based on Maximum. Entropy Models", arXiv preprint cmp-lg/9706014 (1997).

Fabrizio Costa, et al., "Wide Coverage Incremental Parsing by Learning Attachment Preferences", AI* IA 2001: Advances in Artificial Intelligence (2001): 297-307.

* cited by examiner

SYSTEM AND METHOD FOR DIALOG MODELING

PRIORITY INFORMATION

The present application is a continuation of U.S. patent application Ser. No. 14/845,634, filed Sep. 4, 2015, which is a continuation of U.S. patent application Ser. No. 12/324,340, filed Nov. 26, 2008, now U.S. Pat. No. 9,129,601, issued Sep. 8, 2015, the contents of which is incorporated herein by reference in its entirety.

BACKGROUND OF THE INVENTION

1. Field of the Invention

The present invention relates to recognizing speech and more specifically to dialog modeling.

2. Introduction

Dialog modeling is a way to represent a dialog in an understandable, usable structure. Considerable work in the art has been devoted to discourse parsing, including dialog parsing. Much of this work has been focused on offline parsing of the rhetorical and/or semantic structure of a text monologue. Dialog models can be built online for dialog management, or offline for dialog mining and summarization. Corpora of spoken dialog are now widely and increasingly available, and frequently come with annotations for tasks (such as games), dialog acts, named entities, and elements of syntactic structure. These types of information can provide rich clues for building dialog models which current approaches to dialog modeling frequently underutilize or ignore.

Accordingly, what is needed in the art is an improved way to model dialog structure using annotations so that the model can be used to understand and reason about the dialog.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for dialog modeling. The method includes receiving spoken dialogs annotated to indicate dialog acts and task/subtask information, parsing the spoken dialogs with a hierarchical, parse-based dialog model which operates incrementally from left to right and which only analyzes the preceding dialog context to generate dialog parses, and constructing a functional task structure of the parsed spoken dialogs. The method can further: interpret user utterances within the functional task structure of the parsed spoken dialogs; plan system responses to user utterances using the functional task structure of the parsed spoken dialogs; and predict aspects of the next user utterances using the functional task structure of the parsed spoken dialogs. The parse-based dialog model can be a shift-reduce model having a stack and a tree which (a) shifts each utterance onto the stack, (b) inspects the stack, and (c) based on the stack inspection, performs a reduce action that creates subtrees in a binary version of the tree. The parse-based dialog model can be a start-complete model which uses a stack to maintain a global parse state and produces a dialog task structure directly without producing an equivalent binary tree. The parse-based dialog model can be a connection path model which does not use a stack to maintain a global parse state, and which (a) directly predicts a connection path from a root to a terminal for each received spoken dialog and (b) creates a parse tree representing the connection path for each received spoken dialog.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
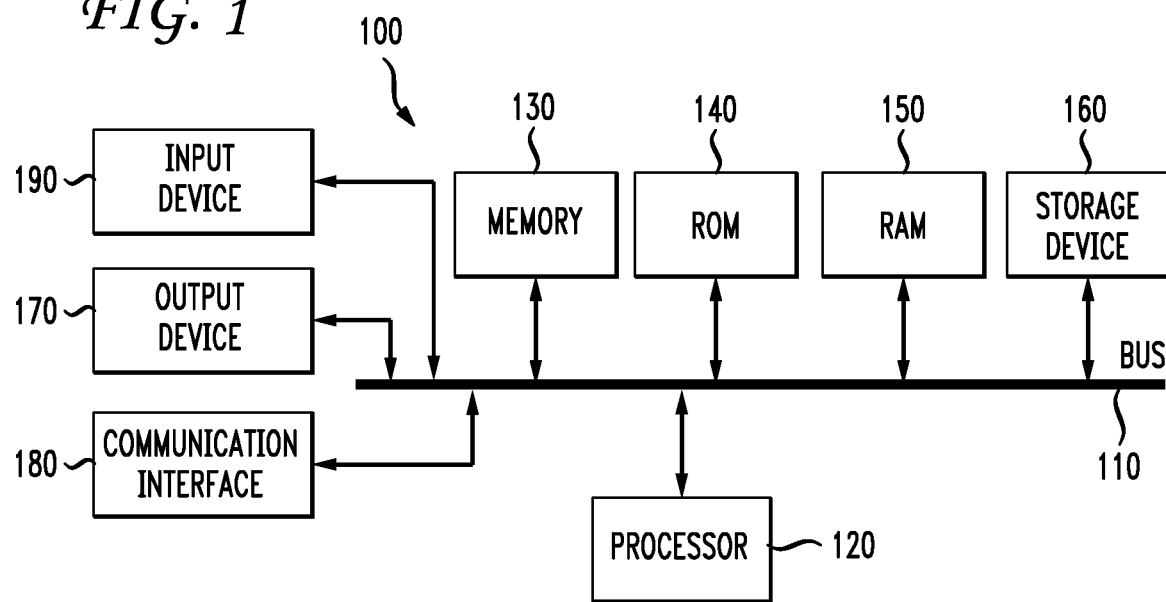
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
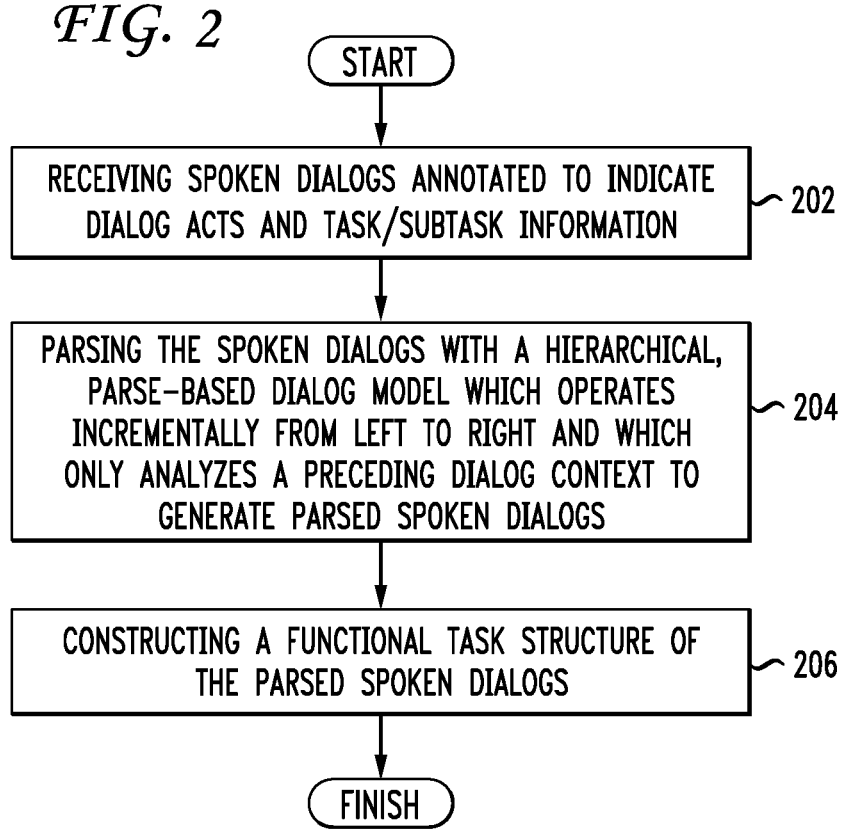
FIG. 2 illustrates an example method embodiment.

Having disclosed some fundamental system components, the disclosure turns to the example method embodiment as shown in FIG. 2. For the sake of simplicity, the example method embodiment is discussed in terms of a system configured to practice the method of dialog modeling. This approach is unique in that it builds the task structure of the dialog (rather than the rhetorical structure), it is incremental (so it can be used for dialog management), and it can be applied to interpreting user utterances as well as planning system responses. The system is intended to use parsing directly for dialog management in addition to for dialog mining and information extraction. The system receives spoken dialogs annotated to indicate dialog acts and task/subtask information (202). Spoken dialogs can be annotated manually and/or automatically.

The system parses the spoken dialogs with a hierarchical, parse-based dialog model which operates incrementally from left to right and which only analyzes the preceding dialog context to generate dialog parses (204). The system constructs a functional task structure of the parsed spoken dialogs (206). The system uses a functional task structure rather than a rhetorical structure.

The functional task structure can serve at least three potential purposes. First, the system can interpret user utterances within the functional task structure of the parsed spoken dialogs. Second, the system can plan system responses to user utterances using the functional task structure of the parsed spoken dialogs. Third, the system can predict the type of the next user utterance using the functional task structure of the parsed spoken dialogs.

The parse-based dialog model can be one of three variations, a shift-reduce model, a start-complete model, or a connection path model. The shift-reduce model uses a stack and a tree and (a) shifts each utterance onto the stack, (b) inspects the stack, and (c) based on the stack inspection, performs a reduce action that creates subtrees in a binary-branching version of the tree. In a shift-reduce model, the system recovers the subtask structure through a right-branching, shift-reduce parsing process. The parser shifts each utterance on to the stack. It then inspects the stack and decides whether to do one or more reduce actions that result in the creation of subtrees in the task structure. Possible parser actions include unary-reduce-X, binary-reduce-X, and shift. X represents each of the non-terminal functions (or nodes) in the tree. A non-terminal function is a function (or node) in a parse tree which is either a root or a branch in the parse tree. Unary-reduce-X pops one token off the stack and pushes the non-terminal function X on the stack. Binary-reduce-X pops two tokens off the stack and pushes the non-terminal function X on the stack. Shift pushes a token representing the utterance onto the stack. At the end of the dialog, the output is a binary branching tree corresponding to the subtask structure.

The parse-based dialog model in the system can be a start-complete model which uses a stack to maintain a global parse state and produces a dialog task structure directly without producing an equivalent binary-branching tree. In the start-complete model, the system directly encodes the local instructions to build the tree in the parser actions. The system uses a stack to maintain the global parse state. For each terminal, the parser decides whether to join that terminal onto the existing left-hand edge of the tree, or start a new subtree. The actions for the parser include start-X, n-start-X, complete-X, u-complete-X and b-complete-X. X represents each of the non-terminals in the tree. Start-X pushes a token representing the current utterance onto the stack. N-start-X pushes non-terminal X onto the stack. Complete-X pushes a token representing the current utterance onto the stack then pops the top two tokens off the stack and pushes the non-terminal X. U-complete-X pops the top token off the stack and pushes the non-terminal X. B-complete-X pops the top two tokens off the stack and pushes the non-terminal X. This model produces a dialog task structure directly, rather than producing an equivalent binary-branching tree.

The parse-based dialog model in the system can be a connection path model which does not use a stack to maintain a global parse state, and which (a) directly predicts a connection path from a root to a terminal for each received spoken dialog and (b) creates a parse tree representing the connection path for each received spoken dialog. In contrast to the shift-reduce and the start-complete models described above, the connection path model does not use a stack to track the global state of the parse. Instead, the parser directly predicts the connection path from the root to the terminal for each utterance. The collection of connection paths for all the utterances in a dialog defines the parse tree. With this model, the parser typically makes many more types of decisions. For example, on one sample set of training data, at each parsing step the connection path model could choose from 195 decision types, whereas the shift-reduce model chose from 32 decision types and the start-complete model chose from 82 decision types.

Figure 3:
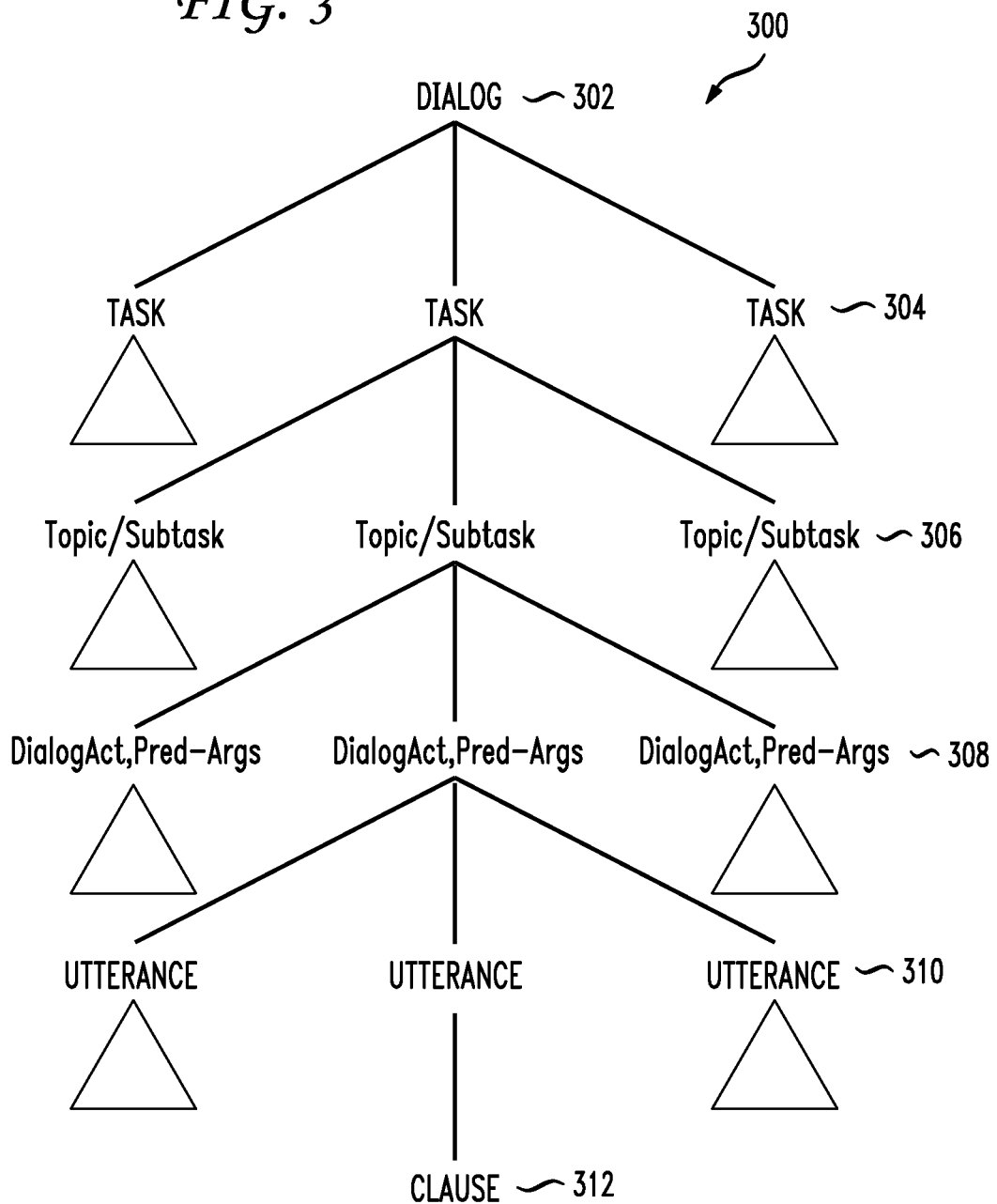
FIG. 3 illustrates a shared plan tree for a dialog.

A task-oriented dialog is the result of incremental creation of a shared plan by dialog participants. FIG. 3 illustrates a shared plan tree for a dialog. The tree 300 representing the shared plan incorporates the task structure 304, the subtask structure 306, dialog acts 308, syntactic structure and lexical content of utterances 310 and clauses 312 in the dialog. A task 304 can include sequences of subtasks 306. A subtask 306 can include sequences of dialog acts 308. Each dialog act 308 corresponds to one clause 312 spoken by one speaker.

Figure 4:
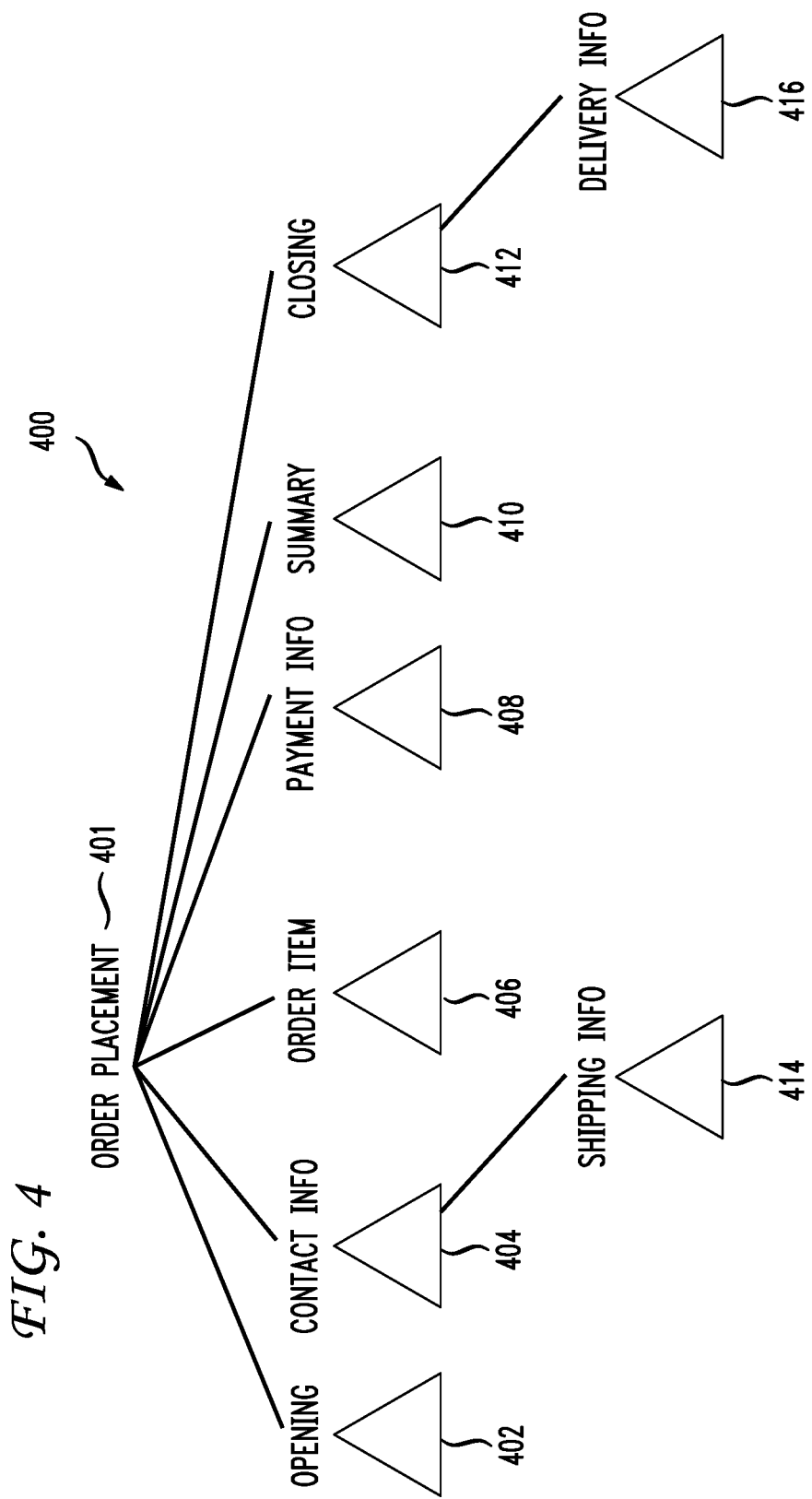
FIG. 4 illustrates a sample output from a parse-based model for dialogs in a catalog ordering domain.

FIG. 4 illustrates a sample output from a parse-based model for a sample dialog in a catalog ordering domain. The output 400 is a task/subtask structure. An order placement 402 task can include typical sequences of subtasks such as opening 402, contact information 404, order item 406, payment information 408, summary 410, closing 412, and related-offers. The output can nest subtasks multiple levels deep, even though FIG. 4 only shows one level deeper than the typical sequences of subtasks. Shipping information 414 is a nested subtask from contact information 404. Delivery information is a subtask from summary 410. Depending on the dialog, nesting can occur more frequently at the leftmost or rightmost frontier of the subtask tree.

Figure 5A:
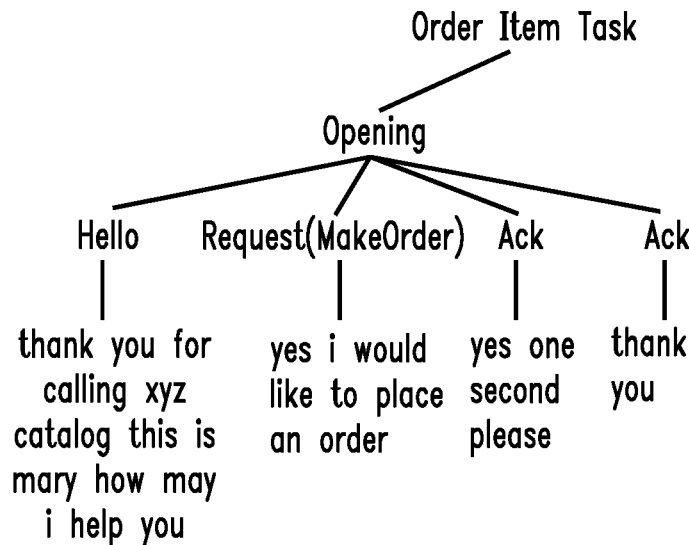
FIGS. 5A-5F illustrate steps in an incremental evolution of a dialog structure.
Figure 5B:
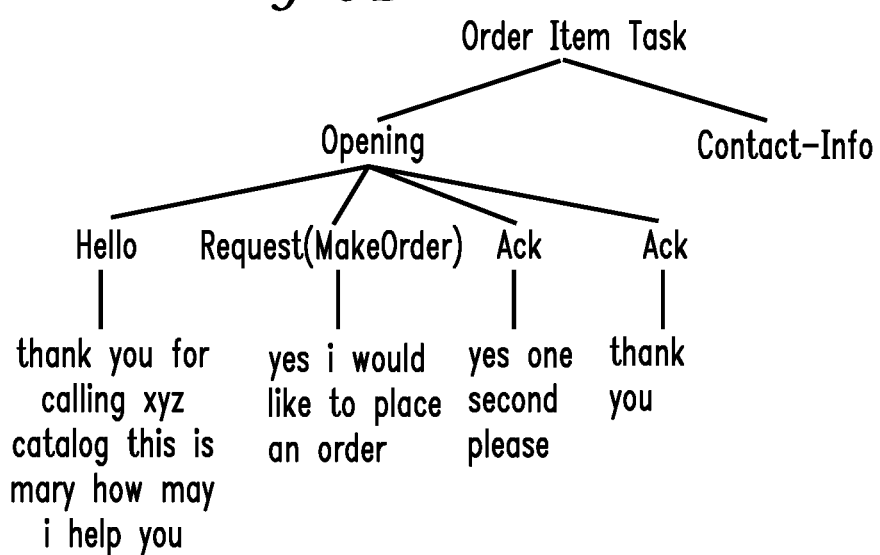
Figure 5C:
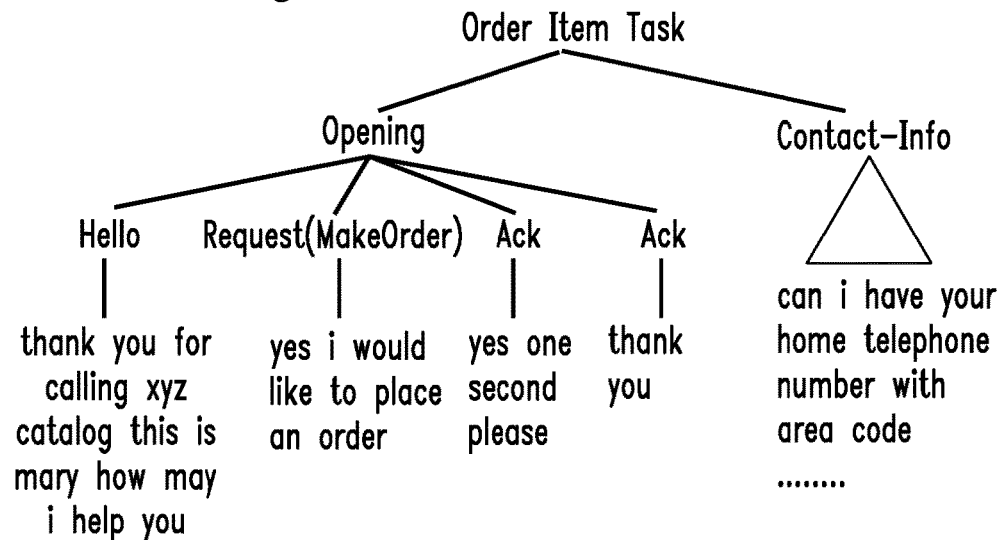
Figure 5D:
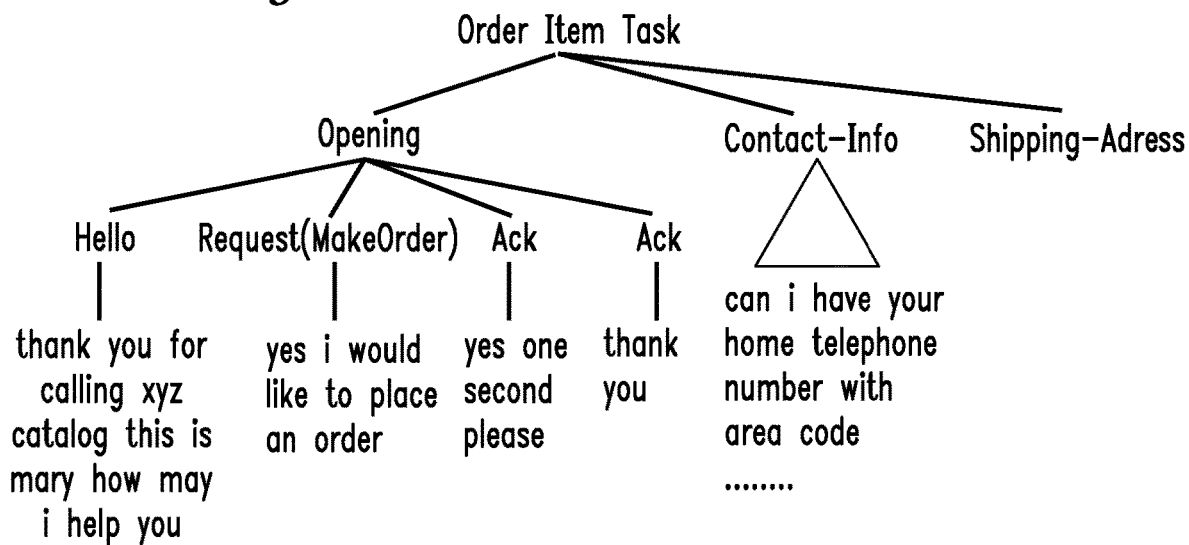
Figure 5E:
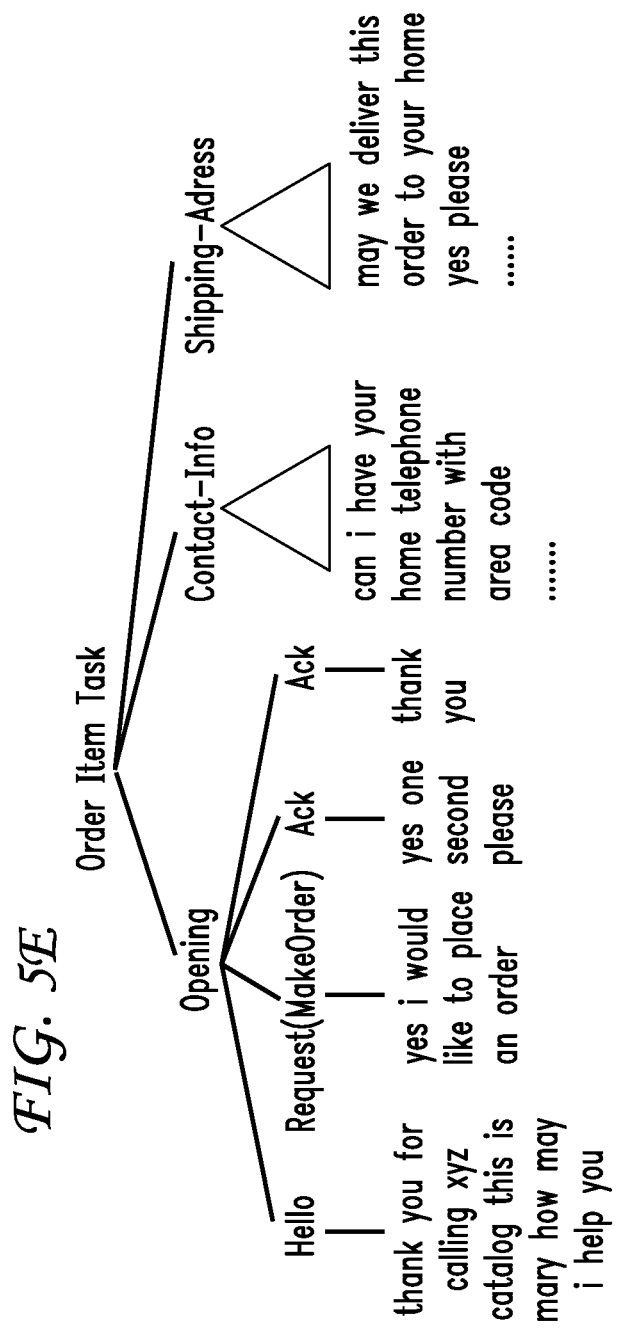
Figure 5F:
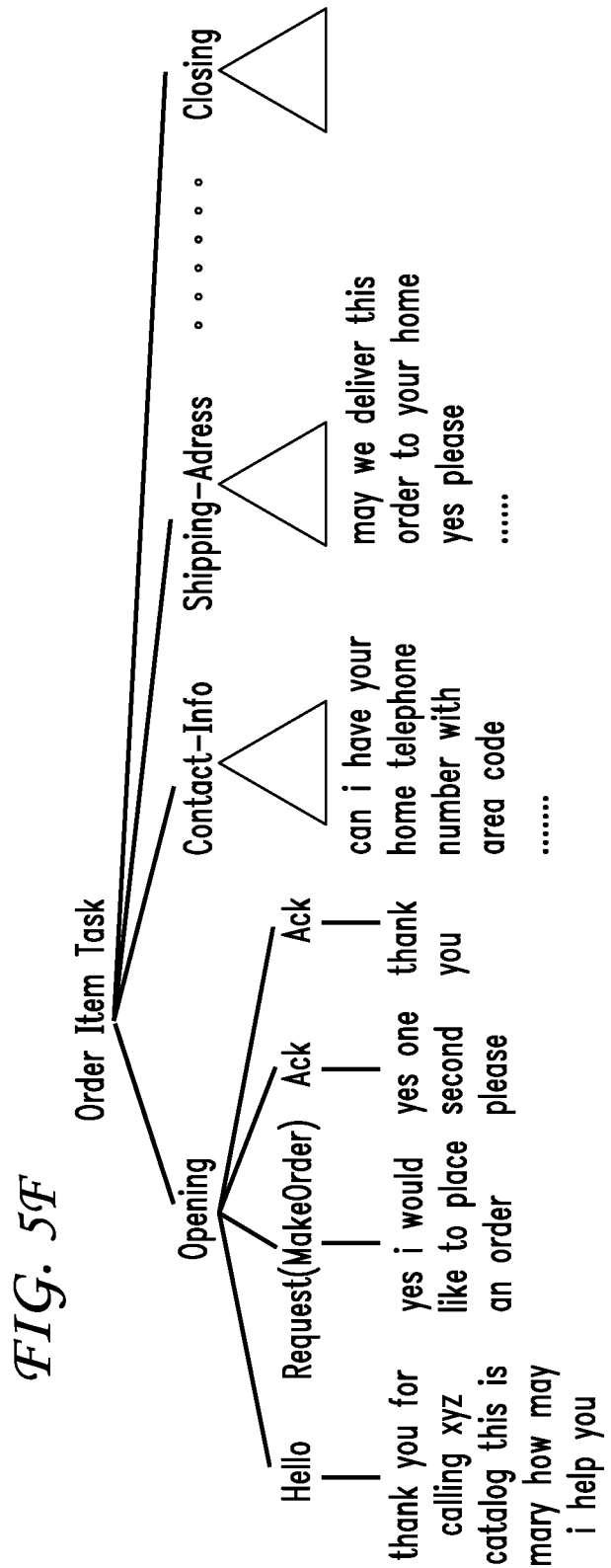

One feature of an incremental sentence parser is that it can accommodate utterances from a participant into the tree as the parser receives them. FIGS. 5A-5F illustrate steps in an incremental evolution of a dialog structure. FIGS. 5A-5F depict an evolving dialog structure of a dialog to order an item. The dialog can be a dialog between two humans or between a human and an interactive voice response (IVR) system. FIG. 5A illustrates the beginning of the dialog from the salutation to the second Ack. FIG. 5B illustrates the formation of a contact information subtask. FIG. 5C shows text of a sample dialog turn to solicit contact information. After the subtask of gathering contact information is complete, FIG. 5D illustrates the formation of the next subtask, shipping address. FIG. 5E shows text of a sample dialog to solicit the shipping address. One or more additional subtasks can follow after the shipping address subtask completes. After each desired subtask is complete or the user indicates they are finished, FIG. 5F shows the formation of the final subtask, closing. After all these incremental steps, the result is a task-based dialog structure which is trained for use in interpreting user utterances and planning system responses to user utterances.

In contrast to an incremental sentence parser, the steps taken to incorporate an utterance into the tree by a dialog parser depend on whether the utterance was produced by the system or the user. The system splits each user turn into clauses which are supertagged and labeled with named entities. The system determines the dialog act of each clause from information about the clause and the immediately preceding dialog context. The system can then incorporate the clause into the task structure.

By contrast, a dialog system starts planning a system utterance by identifying the next subtask based on the task structure to that point. Then, the system chooses the dialog act of the utterance based on the task structure. Finally, the system generates an utterance to realize its communicative intent represented as a subtask and dialog act pair, with associated named entities. The system can accomplish utterance realization in any of the numerous ways known to those of skill in the art.

A dialog system predicts the type of the next user utterance by identifying the likely next subtask based on the task structure following the system utterance. Then, the system predicts the likely dialog act of the next user utterance based on the task structure. Finally, the system uses this information to select a language model for recognizing the next user utterance.

Equation 1 illustrates the probability of an incrementally evolving dialog tree after i exchanges between an agent and a user.

$$P(T_i) = \sum_{t \in T_{i-1}} P(t) * \sum_{s^a \in S} \sum_{d^a \in D} \sum_{d^u \in D} \sum_{s^u \in S} P(s^a \mid t) * P(d^a \mid a^s, t) * P(d^u \mid c_i^u, t) * P(s^u \mid d^u, t) \quad (1)$$

A parse for a dialog can be a shallow or deep tree structure. A shallow parse, or a chunk-based dialog model, is one in which utterances are grouped together into subtasks, but the dominance relations among subtasks are not tracked. The term parse-based dialog model refers to deep parsing models for dialog. This disclosure discusses three alternative parse-based models: shift-reduce, start-complete and connection path. Each of these models operates on the subtask structure for the dialog incrementally, from left-to-right, with access only to the preceding dialog context. These three models differ in the parsing actions and data structures internal to the parser. The instructions to reconstruct the parse are either entirely encoded in the stack, as in the shift reduce model, or entirely encoded in the parsing actions, as in the start-complete and connection path models. For each parsing action required to build the parse tree, the system constructs a feature vector containing contextual information for the parsing action. The system can use these feature vectors and the associated parser actions to train a maximum entropy model. The system then uses this model to incrementally incorporate the utterances for a new dialog into that dialog's task structure as the dialog progresses.

One example data set of spoken dialogs is the CHILD corpus of 817 telephone-based dialogs in a catalog-purchasing domain. Each dialog in the CHILD corpus was transcribed by hand and all numbers (telephone, credit card, etc.) were removed for privacy reasons. The average dialog in this data set has 60 turns. Prior to processing, an automatic process segmented the dialogs into utterances and annotated them with part-of-speech tag and supertag information, named entities, dialog acts, and tasks/subtasks. For example, for the call-level type, some task/subtask labels are call-forward, closing, misc-other, opening, out-of-domain, sub-call. For the task-level type, some task/subtask labels are check-availability, contact-info, delivery-info, discount, order-change, order-item, order-problem, payment-info, related-offer, shipping-address, special-offer, and summary. For the dialog act type "Explain", some subtypes are catalog, CC_related, discount, order_info, order_problem, payment_rel, product_info, promotions, related_offer, and shipping.

The system can use the following features for each utterance: (a) the speaker ID; (b) unigrams, bigrams, and trigrams of the words; (c) unigrams, bigrams, and trigrams of the part of speech tags; (d) unigrams, bigrams and trigrams of the supertags; (e) binary features indicating the presence or absence of particular types of named entity; (f) the dialog act determined by the parser; (g) the task/subtask label determined by the parser; and (h) the parser stack at the current utterance determined by the parser.

An input feature vector has all of these features for up to three utterances of left-hand context, plus the current utterance for interpretation. The label is the parsing action or the dialog act label. If more than one parsing action takes place on a particular utterance, such as a shift operation followed by a reduce operation, the system repeats the feature vector twice with different stack contents.

The system can train models to determine dialog acts for user utterances, determine subtask labels and parsing actions for user utterances, determine subtask labels and parsing actions for system utterances, and determine dialog acts for system utterances. The system can choose a Maximum Entropy distribution that properly estimates the average of each feature over the training data. A machine learning toolkit can encode multiclass classification problems using binary Maximum Entropy classifiers in order to increase the speed of training and to scale the approach to large data sets. Each of the V classes is encoded as a bit vector such that, in the vector for class i, the i-th bit is one and all other bits are zero. Then, V one-vs-other binary classifiers are used as follows:

$$P(y|\Phi) = 1 - P(\bar{y}|\Phi) = \frac{e^{\lambda_y * \Phi}}{e^{\lambda_y * \Phi} + e^{\lambda_{\bar{y}} * \Phi}} = \frac{1}{1 + e^{-\lambda'_y * \Phi}} \quad (2)$$

where $\lambda_{\bar{y}}$ is the parameter vector for the anti-label $\bar{y}$ and $\lambda'_y = \lambda_y - \lambda_{\bar{y}}$. Based on the class independence assumption, the system can require that $y_i=1$ and for all $j \neq i$, $y_j=0$:

$$P(st_i|\Phi) = P(y_i|\Phi) \prod_{j \neq 1}^{V} P(y_j|\Phi) \quad (3)$$

The three parsing models' decoding processes have similar schema of proceeding through the following six tasks: (1) assign-user-dialog-act assigns the dialog act for the user's current utterance; (2) assign-user-subtask predicts the parser action for the user's current utterance; (3) predict-system-subtask predicts the parser action for the system's utterance to be generated; (4) predict-system-dialog-act predicts the dialog act for the system's utterance to be generated; (5) predict-user-subtask predicts the parser action for the user's next utterance; and (6) predict-user-dialog-act predicts the dialog act for the user's next utterance. The system models each of these steps in the decoding process as a classification problem with different feature vectors and label sets (e.g. parse action labels, dialog act labels). The decoder constructs a vector of features depending on the amount of context being used. The system uses this feature vector to query the appropriate classifier model to obtain a vector of labels with weights. The system uses parser action labels to extend the parse data structure. For example, in the shift-reduce model, a shift operation results in a push action on the stack and a reduce-X operation results in popping the top two elements of the stack and pushing X on to the stack. The decoder can use n-best results from the classifier to enlarge the search space. For example, in order to manage the search space effectively, the decoder can use a beam pruning strategy. The decoding process proceeds until it reaches the end of the dialog.

Given that the classifiers are sometimes error-prone in their assignment of labels, the parsing step of the decoder should robustly respond to such errors. The system can rule our incompatible parser actions based on the state of the stack in the different models (e.g. reduce-X action when the stack has one element, shift action on an already shifted utterance). The system can also use n-best results to alleviate the impact of classification errors. Finally, if the stack contains unattached constituents at the end of the dialog, the decoder attaches them as sibling constituents to produce a rooted tree structure. These constraints contribute to robustness, but are not applicable to the connection path model because any parsing action suggested by the classifier can be incorporated into the incremental parse tree. Consequently, when the system uses a connection path model, it has fewer opportunities to correct classifier errors.

The parse structure of dialogs as described herein can be used in online and offline applications. Some example applications include speech dialog mining, monitoring products purchases, monitoring the efficiency of different dialog stages, and measuring effectiveness of different promotional coupons or offers.

In one aspect, the system can use the functional task structure of the parsed spoken dialogs to predict a next user dialog act and subtask label for a user dialog turn and/or a system dialog turn. To accomplish this, the system can incrementally receive user utterances as a dialog progresses, assign a dialog act to a current user utterance based on the functional task structure of the parsed spoken dialogs, assign a subtask label to the current user utterance based on the functional task structure of the parsed spoken dialogs, predict a system subtask label for a next system utterance based on the functional task structure of the parsed spoken dialogs, predict a system dialog act for a next system utterance based on the functional task structure of the parsed spoken dialogs, predict a next subtask label for a next user utterance based on the functional task structure of the parsed spoken dialogs, and predict a next dialog act for a next user utterance based on the functional task structure of the parsed spoken dialogs.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein are applicable to train nearly any spoken dialog system, measure dialog efficiency, and predict user or system dialog acts as well as dialog tasks. Those skilled in the art will readily recognize various modifications and changes that may be made to the present invention without following the example embodiments and applications illustrated and described herein, and without departing from the true spirit and scope of the present invention.

We claim:

1. A method comprising:
training a plurality of hierarchical, parsed-based dialog models, wherein the plurality of hierarchical, parsed-based dialog models comprises one of a shift-reduce model, a start-complete model or a connection path model, and wherein:
  when the plurality of hierarchical, parsed-based dialog models comprises the shift-reduce model, the shift-reduce model has one or more of a stack and a tree which perform one or more of operations comprising (a) shifting each utterance onto the stack, (b) inspecting the stack, and (c) based on a stack inspection, performing a reduce action that creates subtrees in the tree;
  when the plurality of hierarchical, parsed-based dialog models comprises the start-complete model, the start-complete model uses a stack to maintain a global parse state and produces a dialog task structure; and
  when the plurality of hierarchical, parsed-based dialog models comprises the connection path model, the connection path model performs one or more of operations comprising (a) directly predicting a connection path from a root to a terminal for each received spoken dialog, and (b) creating a parse tree representing the connection path for each received spoken dialog;
selecting a selected parse-based dialog model from the shift-reduce model, the start-complete model and the connection path model; and
parsing, via a processor, a subtask structure of a spoken dialog with the selected parse-based dialog model, to yield a parsed spoken dialog.

2. The method of claim 1, further comprising:
constructing a functional task structure of the parsed spoken dialog.

3. The method of claim 2, further comprising:
predicting a likely next dialog act in a spoken dialog using the functional task structure and the hierarchical, parsed-based dialog model, the likely next dialog act corresponding to a next utterance comprising a clause to be spoken by a speaker, wherein the predicting occurs prior to receiving the next utterance.

4. The method of claim 3, further comprising:
selecting a language model for the next utterance based on the likely next dialog act to yield a selected language model.

5. The method of claim 4, further comprising measuring a dialog efficiency at different dialog stages based on the selected language model.

6. The method of claim 1, wherein each of the plurality of hierarchical, parsed-based dialog models operates incrementally from left to right and only analyzes an immediately preceding dialog context.

7. The method of claim 1, wherein, when the plurality of hierarchical, parsed-based dialog models comprises a shift-reduce model, the shift-reduce model has both the stack and the tree which perform operations comprising (a) shifting each utterance onto the stack, (b) inspecting the stack, and (c) based on a stack inspection, performing a reduce action that creates subtrees in the tree.

8. The method of claim 1, wherein, when the plurality of hierarchical, parsed-based dialog models comprises a connection path model, the connection path model does not use a stack to maintain a global parse state.

9. A system comprising:
a processor; and
a computer-readable storage medium having instructions stored which, when executed by the processor, cause the processor to perform operations comprising:
training a plurality of hierarchical, parsed-based dialog models, wherein the plurality of hierarchical, parsed-based dialog models comprises one of a shift-reduce model, a start-complete model or a connection path model, and wherein:
when the plurality of hierarchical, parsed-based dialog models comprises the shift-reduce model, the shift-reduce model has one or more of a stack and a tree which perform one or more of operations comprising (a) shifting each utterance onto the stack, (b) inspecting the stack, and (c) based on a stack inspection, performing a reduce action that creates subtrees in the tree;
when the plurality of hierarchical, parsed-based dialog models comprises the start-complete model, the start-complete model uses a stack to maintain a global parse state and produces a dialog task structure; and
when the plurality of hierarchical, parsed-based dialog models comprises the connection path model, the connection path model performs one or more of operations comprising (a) directly predicting a connection path from a root to a terminal for each received spoken dialog, and (b) creating a parse tree representing the connection path for each received spoken dialog;
selecting a selected parse-based dialog model from the shift-reduce model, the start-complete model and the connection path model; and
parsing a subtask structure of a spoken dialog with the selected parse-based dialog model, to yield a parsed spoken dialog.

10. The system of claim 9, wherein the computer-readable storage medium stores additional instructions stored which, when executed by the processor, cause the processor to perform operations further comprising:
constructing a functional task structure of the parsed spoken dialog.

11. The system of claim 10, wherein the computer-readable storage medium stores additional instructions stored which, when executed by the processor, cause the processor to perform operations further comprising:
predicting a likely next dialog act in a spoken dialog using the functional task structure and the hierarchical, parsed-based dialog model, the likely next dialog act corresponding to a next utterance comprising a clause to be spoken by a speaker, wherein the predicting occurs prior to receiving the next utterance.

12. The system of claim 11, wherein the computer-readable storage medium stores additional instructions stored which, when executed by the processor, cause the processor to perform operations further comprising:
selecting a language model for the next utterance based on the likely next dialog act to yield a selected language model.

13. The system of claim 12, wherein the computer-readable storage medium stores additional instructions stored which, when executed by the processor, cause the processor to perform operations further comprising:
measuring a dialog efficiency at different dialog stages based on the selected language model.

14. The system of claim 9, wherein each of the plurality of hierarchical, parsed-based dialog models operates incrementally from left to right and only analyzes an immediately preceding dialog context.

15. The system of claim 9, wherein, when the plurality of hierarchical, parsed-based dialog models comprises a shift-reduce model, the shift-reduce model has both the stack and the tree which perform operations comprising (a) shifting each utterance onto the stack, (b) inspecting the stack, and (c) based on a stack inspection, performing a reduce action that creates subtrees in the tree.

16. The system of claim 9, wherein, when the plurality of hierarchical, parsed-based dialog models comprises a connection path model, the connection path model does not use a stack to maintain a global parse state.

17. A computer-readable storage device having instructions stored which, when executed by a computing device, cause the computing device to perform operations comprising:
training a plurality of hierarchical, parsed-based dialog models, wherein the plurality of hierarchical, parsed-based dialog models comprises one of a shift-reduce model, a start-complete model or a connection path model, and wherein:
when the plurality of hierarchical, parsed-based dialog models comprises the shift-reduce model, the shift-reduce model has one or more of a stack and a tree which perform one or more of operations comprising (a) shifting each utterance onto the stack, (b) inspecting the stack, and (c) based on a stack inspection, performing a reduce action that creates subtrees in the tree;
when the plurality of hierarchical, parsed-based dialog models comprises the start-complete model, the start-complete model uses a stack to maintain a global parse state and produces a dialog task structure; and
when the plurality of hierarchical, parsed-based dialog models comprises the connection path model, the connection path model performs one or more of operations comprising (a) directly predicting a connection path from a root to a terminal for each received spoken dialog, and (b) creating a parse tree representing the connection path for each received spoken dialog;
selecting a selected parse-based dialog model from the shift-reduce model, the start-complete model and the connection path model; and
parsing a subtask structure of a spoken dialog with the selected parse-based dialog model, to yield a parsed spoken dialog.

18. The computer-readable storage device of claim 17, wherein the computer-readable storage device stores additional instructions stored which, when executed by the computing device, cause the computing device to perform operations further comprising:
constructing a functional task structure of the parsed spoken dialog.

19. The computer-readable storage device of claim 18, wherein the computer-readable storage device stores additional instructions stored which, when executed by the computing device, cause the computing device to perform operations further comprising:

predicting a likely next dialog act in a spoken dialog using the functional task structure and the hierarchical, parsed-based dialog model, the likely next dialog act corresponding to a next utterance comprising a clause to be spoken by a speaker, wherein the predicting occurs prior to receiving the next utterance.

20. The computer-readable storage device of claim 19, wherein the computer-readable storage device stores additional instructions stored which, when executed by the computing device, cause the computing device to perform operations further comprising:

selecting a language model for the next utterance based on the likely next dialog act to yield a selected language model.

\* \* \* \* \*